(12) United States Patent
Park et al.

(10) Patent No.: US 6,894,964 B2
(45) Date of Patent: May 17, 2005

(54) CLOCK SIGNAL GENERATING SYSTEM USING A WOBBLE SIGNAL AND DATA REPRODUCING APPARATUS

(75) Inventors: Hyun-soo Park, Seoul (KR); Jae-seong Shim, Seoul (KR); Kiu-hae Jung, Seoul (KR); Ki-hyun Kim, Daejeon Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 10/176,975

(22) Filed: Jun. 24, 2002

(65) Prior Publication Data

US 2003/0025545 A1 Feb. 6, 2003

(30) Foreign Application Priority Data

Jun. 23, 2001 (KR) ........................................ 2001-36091

(51) Int. Cl.[7] .............................................. G11B 5/09
(52) U.S. Cl. ................................ 369/53.34; 369/47.27; 369/47.28
(58) Field of Search .......................... 369/53.31, 53.34, 369/53.35, 47.24, 47.27, 47.28, 47.31, 47.48, 59.14, 59.16, 124.13, 124.14

(56) References Cited

U.S. PATENT DOCUMENTS

| 6,088,311 | A | * | 7/2000 | Katoh | 369/53.34 |
|---|---|---|---|---|---|
| 6,097,695 | A | * | 8/2000 | Kobayashi | 369/275.4 |
| 6,118,742 | A | * | 9/2000 | Matsui et al. | 369/47.48 |
| 6,192,015 | B1 | * | 2/2001 | Kim | 369/124.14 |
| 6,201,778 | B1 | * | 3/2001 | Sensyu | 369/53.34 |
| 6,377,528 | B1 | * | 4/2002 | Asano | 369/53.31 |

FOREIGN PATENT DOCUMENTS

JP    2001052450 A  *  2/2001  ............ G11B/20/14

* cited by examiner

Primary Examiner—Thang V. Tran
(74) Attorney, Agent, or Firm—Stein, McEwen & Bui, LLP

(57) ABSTRACT

A clock signal generating system using a wobble signal and a data reproducing apparatus, has a first block to detect a frequency error signal or a phase error signal from the RF signals on the recording medium and to output the detected frequency error signal or the detected phase error signal. A second block detects a wobble error signal from the wobble signals on the recording medium and outputs the detected wobble error signal. A clock generating unit generates a clock signal using the detected frequency error signal or the detected phase error signal of the second block when the RF signals have an error, and using the detected wobble error signal of the first block when the wobble signals have an error.

35 Claims, 8 Drawing Sheets

CLOCK SIGNAL GENERATING SYSTEM USING A WOBBLE SIGNAL AND DATA REPRODUCING APPARATUS

CROSS-REFERENCE TO RELATED APPLICATIONS

This application claims the benefit of Korean Application No. 2001-36091, filed Jun. 23, 2001, in the Korean Patent Office, the disclosure of which is incorporated herein by reference.

BACKGROUND OF THE INVENTION

1. Field of the Invention

The present invention relates to a clock signal generating system to reproduce data from a recording medium and a data reproducing apparatus, and more particularly, to a clock signal generating system generating a control clock by selectively using an RF signal and a wobble signal from a recording medium, and a data reproducing apparatus using the clock signal generating system.

2. Description of the Related Art

Generally, when data on a recording medium such as a DVD, a CD, and a DVD-ROM is reproduced, a clock signal is generated from an RF signal on the recording medium through a phase synchronization loop circuit.

In a recordable medium, such as a CD-R, a CD-RW, and a DVD-RAM, concentric tracks from a center of a disc are formed on a surface of the disc. In order to record data at a desired location of the disc surface, a procedure that traces a track having a desired location and then records the data at the desired location is needed. To implement this procedure, a series of jobs are needed to identify location information where a pickup of the optical disc is to be placed. To enable these jobs, a wobble signal having a predetermined frequency is formed on the surface of the disc.

According to the related art, a header in which location information of the disc is recorded based on a predetermined rule is inserted in a middle of the wobble signal, and by reading the header, a current location or an address is determined.

FIG. 1 is a diagram of a part of a DVD-RAM disc structure where the wobble signal and the header information signal are recorded along the track.

A method, in current systems, in which the current location is determined by reading a header signal formed by a predetermined rule leads to complicated disc manufacturing processes. Also, because the wobble signal is not clearly reproduced in a sector where the header is placed, a generation of a phase-locked loop (PLL) signal using the wobble signal needs a special compensation circuit.

SUMMARY OF THE INVENTION

Various objects and advantages of the invention will be set forth in part in the description that follows and, in part, will be obvious from the description, or may be learned by practice of the invention.

To solve the above problems, it is a first object of the present invention to provide a clock signal generating system to reproduce data using a wobble signal. It is a second object of the present invention to provide a data reproducing apparatus of a recording medium using a clock signal generated using a wobble signal.

To accomplish the above and other objects of the present invention, there is provided a clock signal generating system to record and/or reproduce data to/from a recording medium on which wobble signals and radio frequency (RF) signals are recorded, the clock signal generating system including: a first block detecting a frequency error signal or a phase error signal from the RF signals on the recording medium and outputting the detected frequency error signal or the detected phase error signal; a second block detecting a wobble error signal from the wobble signals on the recording medium and outputting the detected wobble error signal; and a clock generating unit generating a clock signal using the detected frequency error signal or the detected phase error signal of the second block when the RF signals have an error, and using the detected wobble error signal of the first block when the wobble signals have an error.

The first block includes: a blank detecting unit detecting a blank sector from the RF signals; a frequency error detecting unit detecting a difference between a frequency of the RF signals and a frequency of a present clock signal which oscillates to output the frequency error signal; and a phase detecting unit generating a phase error signal if the frequency error signal detected by the frequency error detecting unit is within a predetermined scope.

The clock generating unit selects one of output signals from the first block and the second block according to whether a blank signal exists, and generates a clock signal using the selected output value.

The second block includes: a wobble counter counting the wobble signals using the clock signal and outputting a wobble count value indicative thereof; a wobble error detector outputting a wobble lock signal indicating whether an error occurred in the wobble signals in a predetermined sector, and outputting an average wobble value, using the wobble count value; and a wobble error generator outputting a difference of the average wobble value and a predetermined wobble reference value when the wobble error detector determines that there is no error in the wobble signals.

The wobble counter includes: a delay unit delaying the wobble signals and outputting two of the wobble delay signals having one cycle clock difference; a reset circuit unit generating a counter reset signal using the two wobble delay signals; and a counter counting wobble signals using the clock signal until the counter reset signal is input from the reset circuit.

The delay unit outputs a first delay signal, which is obtained by delaying the wobble signals for one cycle clock, and a second delay signal, which is obtained by delaying the first delay signal for one cycle clock.

The reset circuit unit includes: a first operation unit performing a first logic operation of the first delay signal and the second delay signal; a second operation unit performing a second logic operation of the output of the first operation unit and the first delay signal; and a third operation unit performing a third logic operation of the output of the second operation unit and outputs the result which is a reset signal.

The wobble error detector includes: a calculation unit obtaining the average value of wobble signals counted for n sectors; a wobble error detector outputting a signal indicating that there is no error in the wobble signals if a difference of two of the wobble signals which are input continuously is less than a predetermined value, and outputting a signal indicating that there is an error in the wobble signals if the difference of the two wobble signals, which are input continuously, is equal to or greater than the predetermined value; and a wobble lock signal generator outputting the wobble lock signal which is a result of a logic operation of n output signals obtained from the wobble error detector.

The wobble error generator includes: a subtracter outputting an error obtained by subtracting a predetermined wobble reference value from the average wobble value; and a selector outputting the error as a wobble error value when the wobble lock signal indicates that there is no error in the wobble signals.

The recording medium is a digital versatile disc-random access memory (DVD-RAM), and the predetermined wobble reference value is 186.

The clock generating unit includes: an error accumulator adding the detected error signals of the first block and the second block; a digital-to-analog converter (DAC) converting the added detected error signals from the error accumulator into an analog signal; and a voltage-to-frequency converter (VFO) outputting the clock signal obtained by frequency modulation of the analog signal from the DAC.

To accomplish the above and other objects of the present invention, there is provided a clock generating apparatus generating a clock signal using wobble signals from a recording medium, the clock generating apparatus including: a wobble counter outputting a count value obtained by counting the wobble signals using the clock signal; a wobble error detector calculating an average wobble value from the count value in a predetermined sector, and generating a wobble lock signal indicating whether an error occurred in the wobble signals in the predetermined sector; a wobble error generator generating and outputting a difference of the average wobble value and a predetermined number of clock signals corresponding to a reference wobble value when the wobble lock signal indicates that there is no error in the wobble signals; an error accumulator selectively taking a wobble error, a frequency error and a phase error in an RF signal stream on the recording medium, and adding the wobble error, the frequency error, and/or the phase error as an output voltage signal; and a voltage-to-frequency converter outputting the clock signal obtained by frequency modulation of the output voltage signal from the error accumulator.

Also, to accomplish the above and other objects of the present invention, there is provided a clock signal generating system to record and/or reproduce data to/from a recording medium on which wobble signals and radio frequency (RF) signals are recorded, the clock signal generating system including: a blank detecting unit detecting a blank sector of the RF signals; a frequency error detecting unit detecting a difference between a frequency of the RF signals and a frequency of a present clock signal; a phase detecting unit generating a phase error signal if a difference of the frequency of the RF signals and a clock frequency is within a predetermined scope according to the frequency error detecting unit; a wobble counter outputting a count value obtained by counting the wobble signals using the system clock; a wobble error detector outputting a wobble lock signal indicating whether an error occurred in the wobble signals during a predetermined time, and outputting an average wobble value; and a wobble error generator outputting a difference of the average wobble value and a predetermined wobble reference value when the wobble error detector determines that there is no error in the wobble signals; an error accumulator outputting a frequency error or a phase error if the blank sector of the RF signals is not detected, and outputting a wobble error signal if the blank sector is detected; a digital-to-analog converter (DAC) converting the frequency error, the phase error, or the wobble error signal from the error accumulator into an analog signal; and a voltage-to-frequency converter outputting a clock signal obtained by frequency modulation of the analog signal from the DAC.

To accomplish the above and other objects of the present invention, there is provided an apparatus to reproduce data on a recording medium on which a wobble signal and RF signals are recorded, the apparatus including: a preprocessing unit processing a variety of signals read by a pickup and generating a summing signal of the RF signals and the wobble signal to generate binary data; a binarization unit reproducing the binary data of the preprocessing unit using a clock signal; a first block detecting a frequency error signal or a phase error signal from the RF signals on the recording medium and outputting the detected frequency error signal or the detected phase error signal; a second block detecting a wobble error signal from the wobble signal on the recording medium and outputting the detected wobble error signal; and a clock generating unit generating the clock signal using the detected signals of the first block and the second block.

Also, to accomplish the above and other objects of the present invention, there is provided an apparatus to reproduce data on a recording medium on which wobble signals and RF signals are recorded, the apparatus including: a preprocessing unit processing a variety of signals read by a pickup and generating a summing signal of the RF signals and the wobble signals to generate binary data; a binarization unit reproducing the binary data of the preprocessing unit using a clock signal; a blank detecting unit detecting a blank sector of the RF signals; a frequency error detecting unit detecting a difference between a frequency of the RF signals and a frequency of a present clock signal; a phase error detecting unit generating a phase error signal if the difference of the frequency of the RF signals and the frequency of the present clock signal is within a predetermined scope; a wobble counter outputting a count value obtained by counting the wobble signals using a system clock; a wobble error detector outputting a wobble lock signal indicating whether an error occurred in the wobble signals for a predetermined time, and calculating an average wobble value; a wobble error generator outputting a difference of the average wobble value and a predetermined wobble reference value when the wobble error detector determines that there is no error in the wobble signals; an error accumulator outputting a frequency error or a phase error if the blank sector of the RF signals is not detected, and outputting a wobble error signal if the blank sector is detected; a digital-to-analog converter (DAC) converting the frequency error, the phase error, or the wobble error signal from the error accumulator into an analog signal; and a voltage-to-frequency converter outputting a clock signal obtained by frequency modulation of the analog signal from the DAC.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 1:
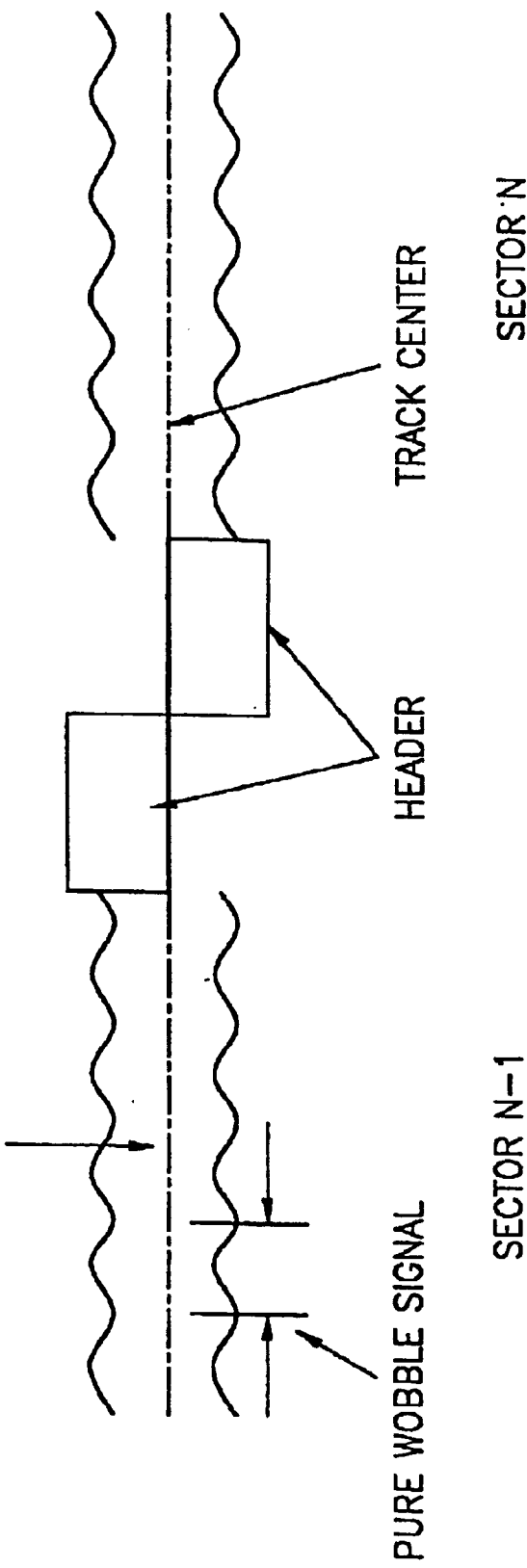
FIG. 1 is a diagram of a part of a DVD-RAM disc structure.
Figure 2:
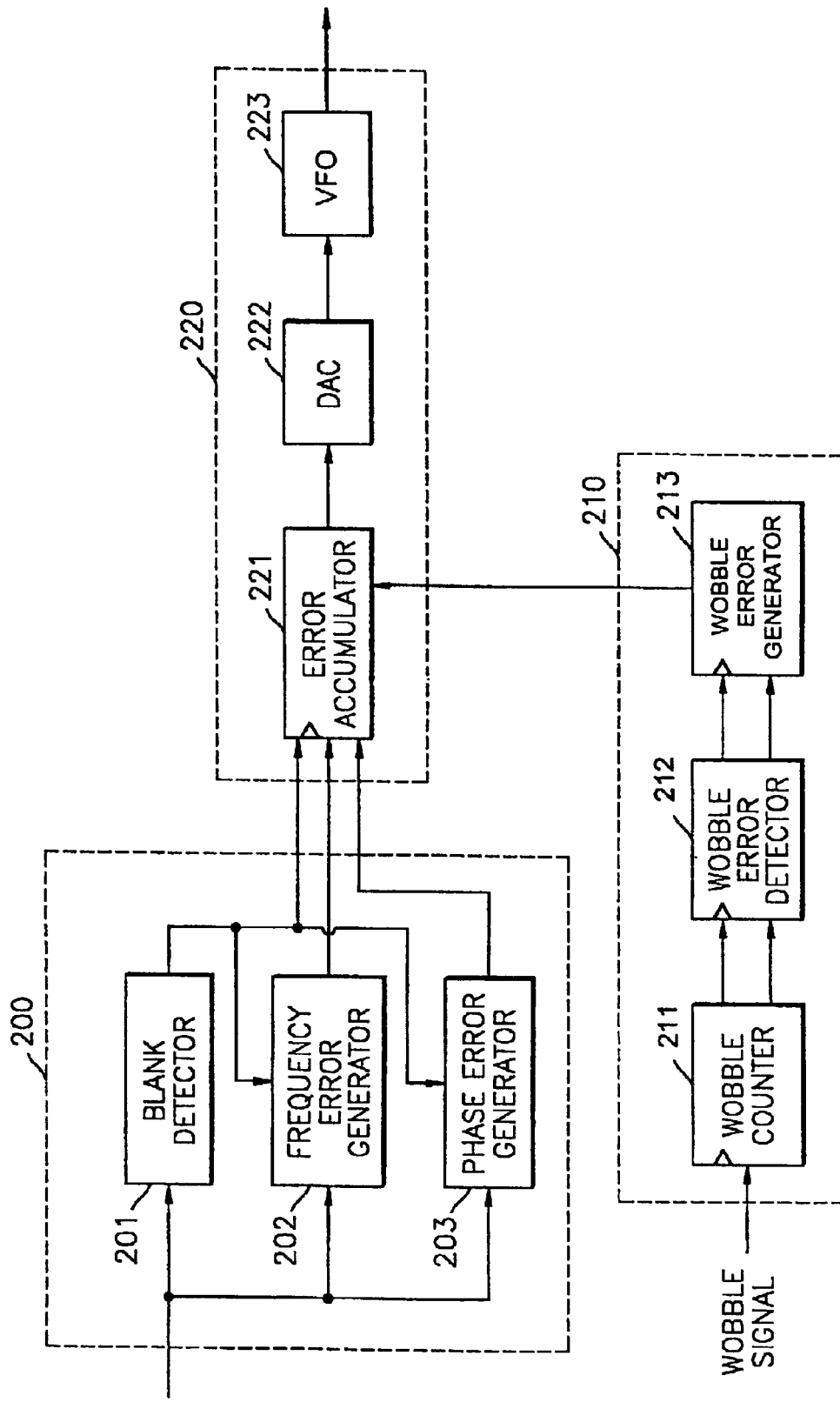
FIG. 2 is a diagram of a clock signal generating system according to the present invention.

Referring to FIG. 2, a clock signal generating system has a first block 200 which traces a frequency component of an RF signal recorded on a recording medium and generates a frequency error signal, or traces a signal phase and generates a phase error signal. A second block 210 generates a wobble error signal from a wobble signal on the recording medium. A clock generating unit 220 selects a first output signal corresponding to the frequency error signal or the phase error signal from the first block 200 in an area where the RF signal is normally recorded, and selects a second output signal from the second block 210 in an area where no RF signal or a low frequency RF signal is recorded, and generates a clock signal through frequency-modulation according to a size of a voltage input.

The first block 200 is a circuit generating a clock signal using the RF signal recorded on the recording medium and includes a blank detector 201, a frequency error generator 202, and a phase error generator 203. The blank detector 201 detects a blank sector from the RF signal, or from a summing signal of RF signals. When the input signal is the summing signal of the RF signals, the blank detector 201 observes a size of the summing signal and detects whether the input signal skews in one direction for more than a predetermined time. A state in which an amplitude of the input signal becomes smaller than a predetermined value or the input signal skews in one direction indicates an abnormal state of the RF signal. Therefore, a detection result of the blank detector 201 determines whether or not an RF signal in a sector on the recording medium, which is read, is appropriate to generate the clock signal. An embodiment of the blank detector 201 is disclosed in Korean Patent No. 1999-13983, incorporated herein by reference, filed by the same applicant as the inventor of the present invention. According to the output of the blank detector 201, it is determined whether the clock signal is generated using the RF signal or the wobble signal. That is, according to the output of the blank detector 201, the operations of the first block 200 and the second block 210 are selectively performed. The frequency error generator 202 detects a frequency error signal, which is a frequency difference between a present clock signal and a detected clock signal or input signal. The phase error generator 203 detects the phase error signal, which is a phase difference between the present clock signal and the RF signal or the RF summing signal on the recording medium.

The signal used to generate the clock signal is not the frequency error signal from the frequency error generator 202, but the phase error signal by the phase error detector 203. That is, applying a phase control loop to the phase error signal generates a phase synchronization signal, and from the generated phase synchronization signal the clock signal is generated. However, when a pickup is performed in a broader operational frequency band, for example, when a searching speed of the recording medium increases, the phase control loop using only the phase error requires many iterations in order to generate the clock signal appropriate to a corresponding pickup operation speed.

Therefore, by obtaining the frequency difference between the detected clock signal or the input signal and the frequency of the present clock signal, the phase synchronization signal from the phase synchronization loop is obtained in a state where an operational scope of the frequency to be traced is roughly identified, and accordingly, the clock signal which can quickly trace the frequency band of the input signal can be generated. For this reason, the frequency error generator 202 is used. An example of the frequency error detector structure described above is disclosed in Korean Patent No. 1999-50947, "A method for detecting a frequency in a digital phase control loop", and in Korean Patent No. 1999-19020, "A circuit and method for restoring digital clock".

In general, for a disc on which the data can be recorded only once, such as a CD or a DVD, a system clock signal needed to produce the data from the disc can be generated using only the first block 200. However, in a rewritable disc capable of recording data thousands of times there is a problem. That is, in a DVD-RAM, for example, because no data is recorded on an original disc, the RF signal or the RF summing signal cannot be obtained excluding a header part. Because the header part takes just a very small portion of the entire data, the frequency error generator 202 cannot be operated only with the header part. Then, it is impossible to provide information of the frequency error, which the phase error detector 203 can quickly trace. To solve this problem, in the present invention, the second block 210 is added so that a clock signal can be generated using the wobble signal when it is difficult to use the RF signal.

The second block 210 is a circuit to generate the clock signal using the wobble signal on the recording medium, and includes a wobble counter 211, a wobble error detector 212, and a wobble error generator 213.

The wobble counter 211 counts cycles of the wobble signal with respect to the clock signal and outputs a resulting count value. The wobble error detector 212 obtains an average wobble value in a predetermined sector using the resulting count value from the wobble counter 211, determines whether or not there is an error in the wobble signal in the sector, and outputs a result indicative thereof as a wobble lock signal.

The wobble error generator 213 calculates the wobble error, which is a difference between the average wobble value and a predetermined wobble reference value. Then, the wobble error generator 213 selects whether the wobble error in the sector will be output or the wobble error will be reset to 0 and outputs the wobble error signal according to the wobble lock signal. If the wobble lock signal indicates that there is an error in the wobble signal, the wobble error is reset to 0 and the wobble error is not taken into consideration.

The clock generating unit 220 which generates a clock signal according to the outputs from the first block 200 and the second block 210, includes an error accumulator 221, a digital-to-analog converter (DAC) 222, and a voltage frequency converter, Variable Frequency Oscillator (VFO) 223.

The error accumulator 221 selects one of the frequency error signal, the phase error signal, and the wobble error signal according to the detection result from the blank detector of the first block 200 and outputs a selected error signal. The DAC 222 converts the selected error signal from the error accumulator 221 into an analog signal. The VFO 223 converts a voltage of the analog-converted error signal into the clock signal and outputs the clock signal.

Figure 3:
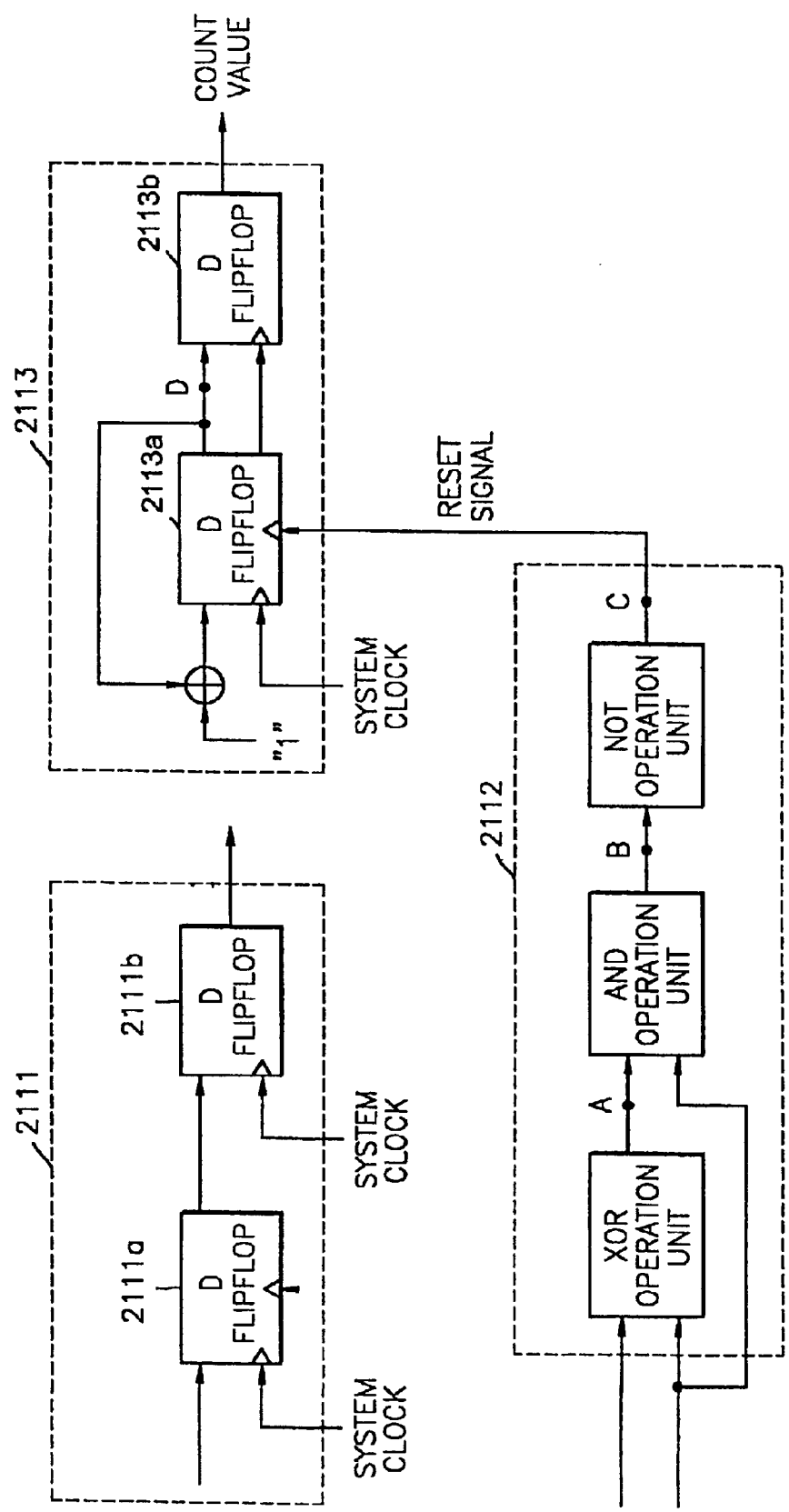
FIG. 3 is a detailed diagram of a wobble counter according to the present invention.
Figure 4:
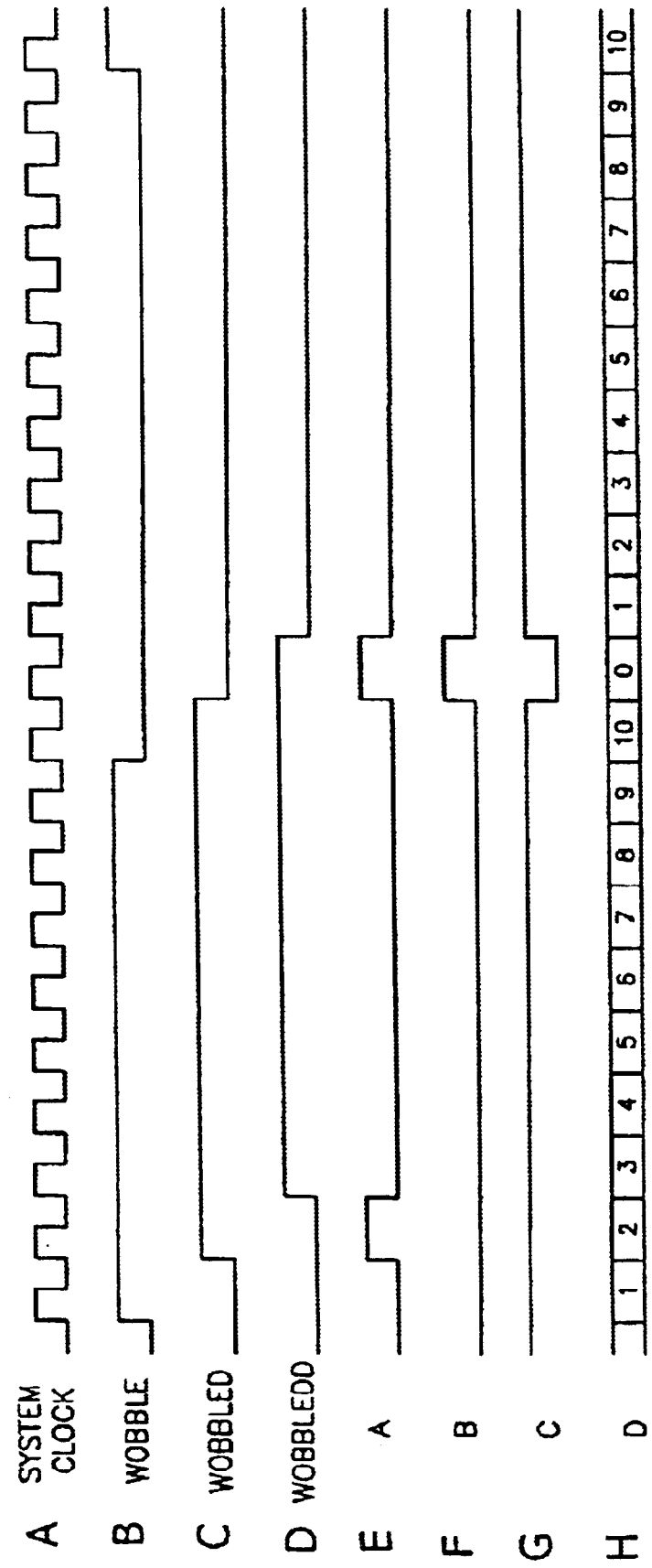
FIGS. 4A–4H are timing diagrams of input and output signals of modules illustrated in FIG. 3.

FIG. 3 is a detailed diagram of the wobble counter 211 of FIG. 2. The wobble counter 211 includes a delay unit 2111, a reset circuit unit 2112, and a counter 2113. The delay unit 2111 delays the wobble signal using two delay D flip-flops devices 2111a and 2111b. The D flip-flop device 2111 a outputs a first wobble delay signal, which is obtained by delaying the wobble signal for one cycle from the present or current clock signal. The D flip-flop device 2111b outputs a second wobble delay signal, which is obtained by delaying the wobble signal for two cycles from the current clock signal.

The reset circuit unit 2112 generates a counter reset signal using the first and second wobble delay signals from the delay unit 2111. The reset circuit unit 2112 may be formed with an XOR gate, an AND gate, and a NOT gate, in which the XOR gate XORs the first wobble delay signal and the second wobble delay signal, the AND gate ANDs an output result from the XOR gate and the first wobble delay signal, and the NOT gate NOTs an output from the AND gate.

The counter unit 2113 unconditionally increments by 1 according to an input system clock signal, and if a reset signal is input from the reset circuit unit 2112, the counter unit 2113 resets the counted value to 0 and then counts 1 from the next cycle. A count value is latched by D flip-flops 2113a and 2113b and whenever the wobble signal is input, a predetermined count value is output.

Figure 5:
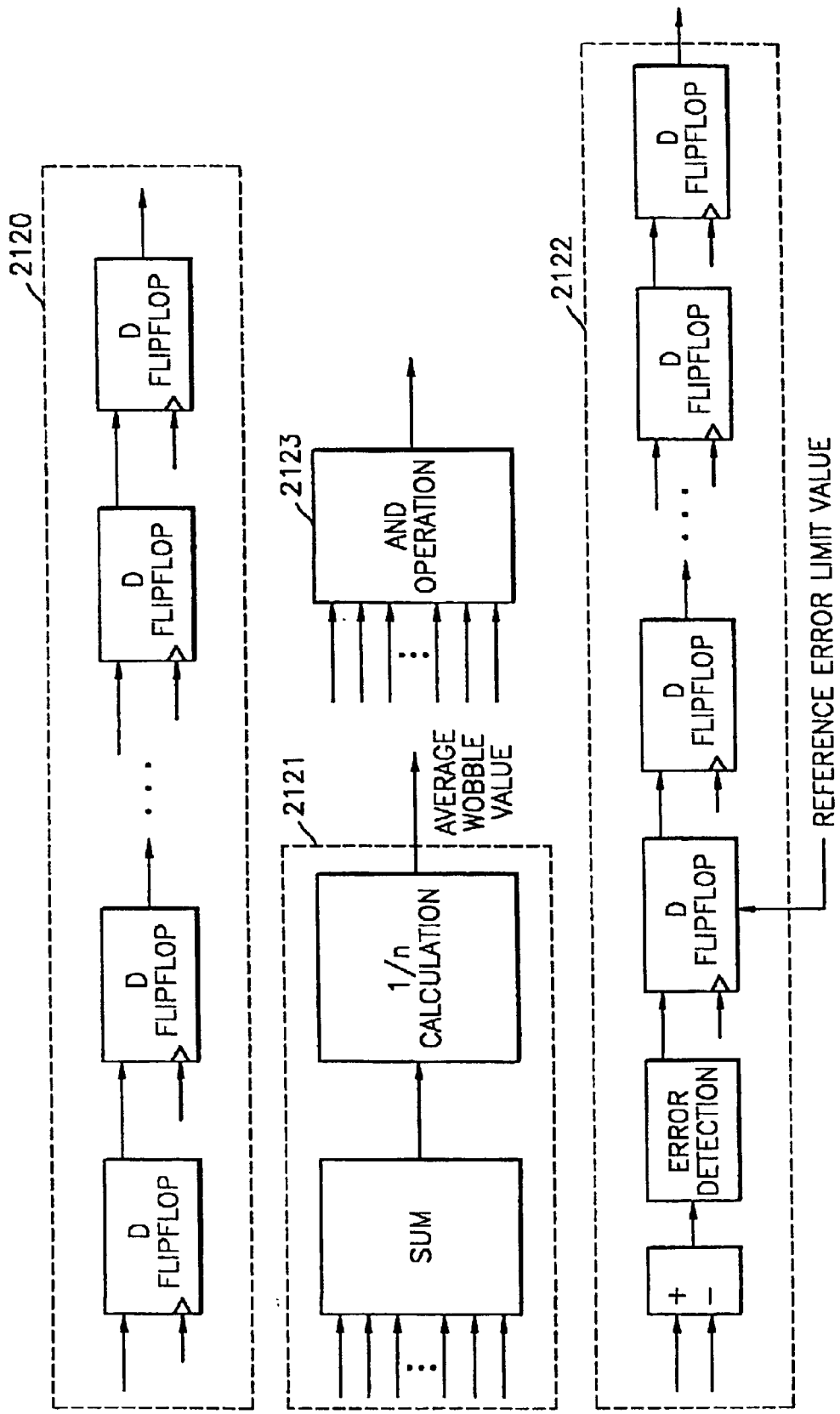
FIG. 5 is a detailed block diagram of a wobble error detector of according to the present invention.

FIGS. 4A–4H are timing diagrams of the input and output signals of the modules of FIG. 3. FIG. 5 is a detailed block diagram of the wobble error detector 212 of FIG. 2.

A calculating unit 2121 in FIG. 5 obtains an average of wobble signals counted in n sectors. The count value output from the wobble counter 2111 of FIG. 3 is input to a delay block 2120 in FIG. 5 that is formed by sequentially connecting D flip-flops. The count value moves along the D flip-flops of the delay block 200, taking the wobbled signals which are sequentially obtained from the wobble counter 2111 and delayed for one clock cycle, as a clock source. When i=1, 2, . . . , n, a signal which is delayed for i cycle(s) is referred to as data (i). Outside the clock signal generating system, a microcomputer or a control means can determine n, which is a number of delay tabs. When it is desired to check whether or not a stable wobble signal is input for a long sector, a large n value is determined. When a small n value is determined, wobble values can be updated in each short sector. In general, 4, 8, or 16 are used as the n value. The calculating unit 2121 adds data from data (1) through data (n) and divides the added data by n. Accordingly, the output of the calculating unit 2121 is the average value of the input wobble cycle in the n sectors.

A wobble error detector 2122 obtains a difference between two consecutive input wobble signals for predetermined sectors (here, n sectors), and then obtains wlock(1), . . . , wlock(n), each of which is a signal indicating if the difference is less than a predetermined value, which means that there is no error in the wobble signal, or else, means that there is an error in the wobble signal. When there is an error in a wobble signal, wlock is output as 0 and when there is no error in the wobble signal, wlock is output as 1. A determination as to whether there is an error or not in the wobble signal is made by a difference of two continuous input wobble signal data (1) and data (2). That is, if the difference of the two data items (1) and (2) is less than a predetermined value, then 1 is output, and if the difference of the two items is equal to or greater than the predetermined value, then 0 is output.

A wobble lock signal generator 2123 receives each wobble signal from the wobble error detector 2122 and ANDs the received signals. The result of the AND operation is output as a wobble lock signal. Therefore, only when wlock (i) (i=1~n) is input and is equal to 1, which indicates that there is no error in the wobble signals for the n sector, the wobble lock signal is output as 1, and if at least one wlock that is equal to 0 is input for the n sectors, the wobble lock signal is output as 0. Later, this wobble lock signal is used to determine whether or not the wobble error is taken into consideration in a corresponding sector. That is, if the wobble lock signal is equal to 1, it is determined that the wobble signal is normally input for the n sectors, and the wobble error in the corresponding sector is taken into consideration. If the wobble lock signal is 0, it is determined that the wobble signal is not appropriate for the n sectors, and the wobble error may not be taken into consideration.

Figure 6:
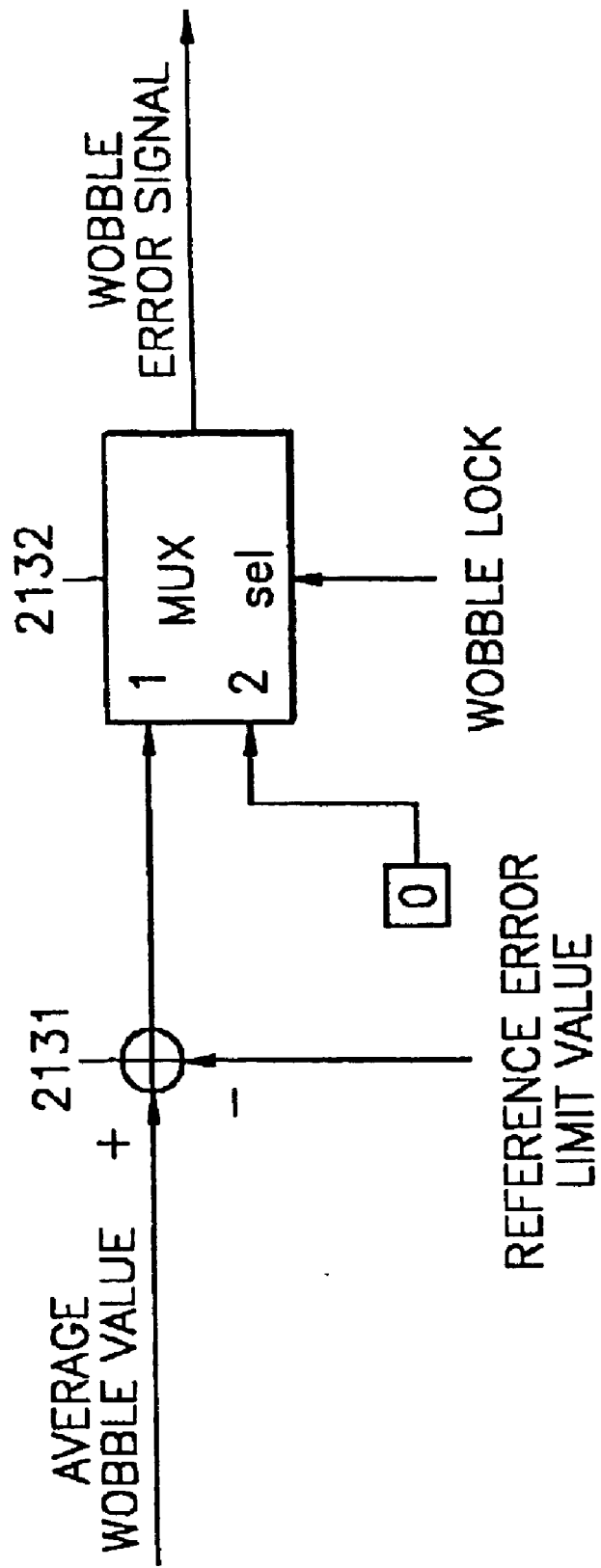
FIG. 6 is a detailed diagram of a wobble error generator according to the present invention.

FIG. 6 is a detailed diagram of the wobble error generator 213 of FIG. 2, which includes a subtracter 2131 and a selector 2132. The subtracter 2131 outputs an error, which is obtained by subtracting a predetermined wobble value from the average wobble value calculated in the wobble error detector 212. Here, the predetermined wobble value is a value determined by a user or a system, and corresponds to a number of the clock signals which are input for one wobble cycle. When the recording medium is a DVD-RAM disc, this value is 186.

The selector 2132 determines whether or not to select the error obtained by the subtracter 2131. When the wobble lock signal indicates a wobble signal error (wobble lock=0), it means that the average wobble signal is not reliable because of an error in the wobble input signal, and therefore, the selector 2132 outputs 0, and does not select the output value from the subtracter 2131. When the wobble lock signal indicates a normal wobble signal (wobble lock=1), the wobble count value is input stably for predetermined sectors, and therefore the selector 2132 selects the error value from the subtracter 2131 and outputs the value as the wobble error signal. Accordingly, the wobble error signal is output only when the wobble signal is input stably. At this time, if the frequency of the entire clock signal is almost the same as the wobble frequency, the wobble error has a value of 0 in a normal state.

Figure 7:
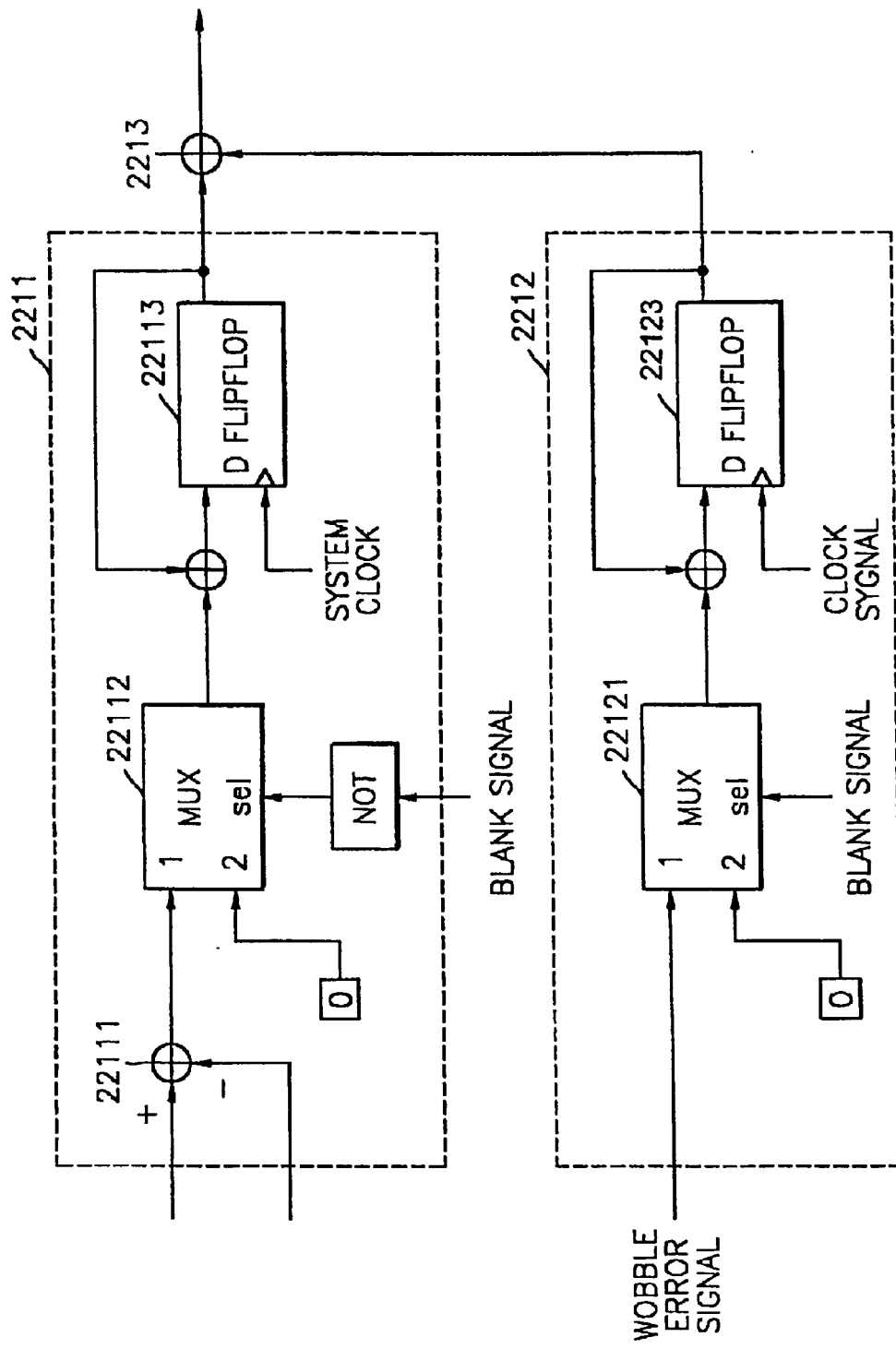
FIG. 7 is a detailed block diagram of an error accumulator in the clock signal generating system of FIG. 2.

FIG. 7 is a detailed block diagram of the error accumulator 221 in the clock generating unit 220 of FIG. 2. Referring to FIG. 7, the clock generating unit 221 includes a frequency/phase error selection block 2211, a wobble error selection block 2212, and an error adder 2213.

The frequency/phase error selection block 2211 includes an adder 22111, a first selector 22112, and a first accumulator 22113. The adder 22111 adds the phase error signal and the frequency error signal and outputs a result of the addition. The first selector 22112 selects and outputs the addition result of the adder 22111 or selects and outputs 0 according to a blank signal. The first selector 22112 selects the addition result of the adder 22111 when the RF signal or the RF summing signal is input as a value indicating that no blank occurred. The first accumulator 22113 adds the current output of the first selector 22112 to a previous output whenever the clock signal is input and outputs the added result.

The wobble error selection block 2212 includes a second selector 22121 and a second accumulator 22123. The second selector 22121 selects and outputs the wobble error signal or selects and outputs 0 according to the blank signal. The second selector 22121 performs selection operations in a way opposite to that of the first selector 22112. That is, only when the blank signal indicating that a blank occurs in the RF signal, the second selector 22121 selects and outputs the wobble error signal.

The second accumulator 22122 adds the previous accumulated result and the wobble error value output from the second selector 22121 whenever a wobble signal (more accurately, the one cycle delayed wobble signal "wobbled") is input. The error adder 2213 adds the output of the frequency/phase error selection block 2211 to the output values of the wobble error selection block 2212. The output of the error adder 2213 is input to the D/A converter and the VFO, and then is used in generating the clock signal.

Figure 8:
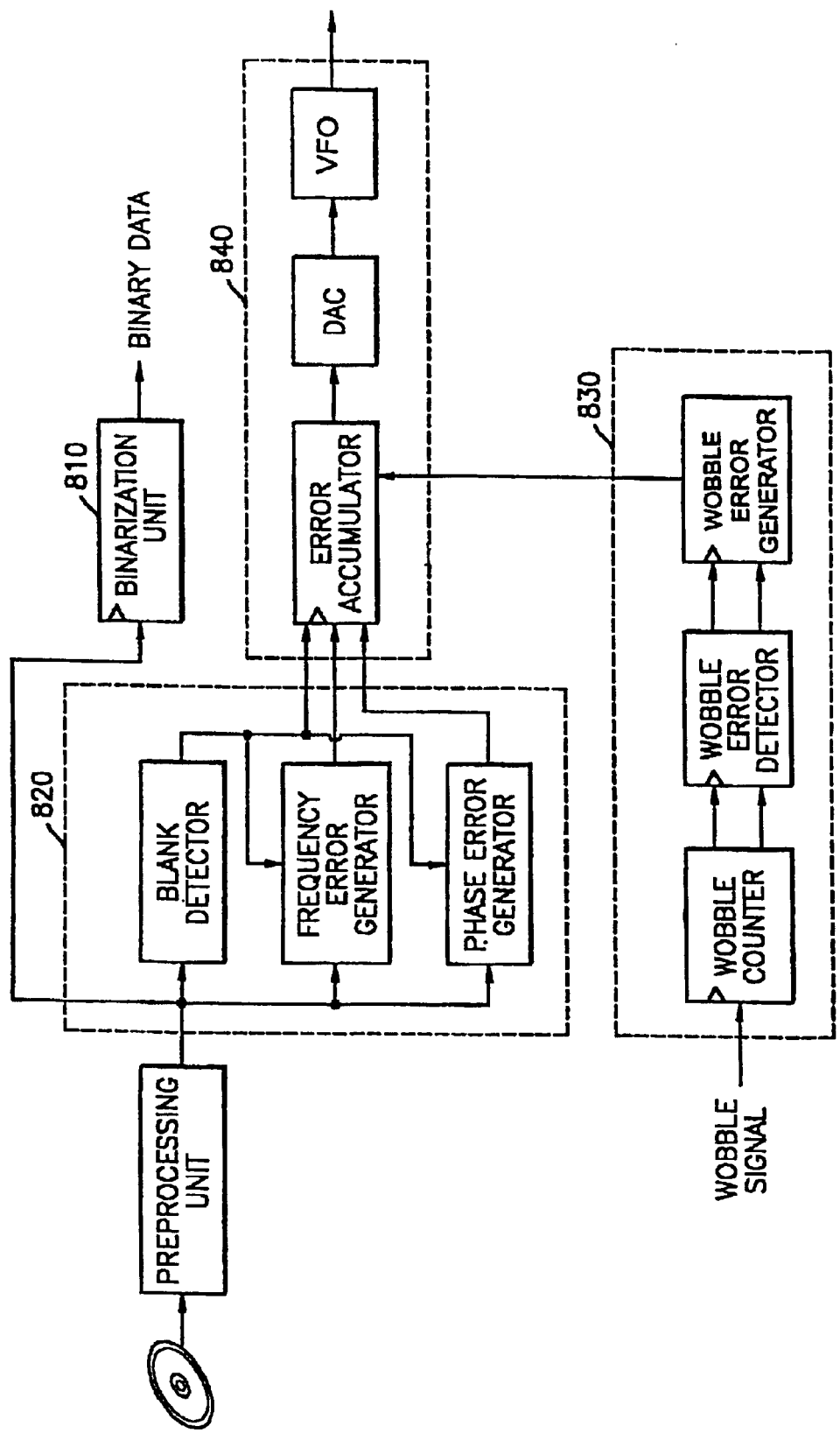
FIG. 8 is a block diagram of a data reproducing apparatus according to the present invention.

FIG. 8 is a block diagram of a data reproducing apparatus of the present invention. Referring to FIG. 8, the data reproducing apparatus includes a preprocessing unit 800 which preprocesses a signal read from the recording medium, a binarization unit 810 which binarizes the preprocessed signal, and a first block 820 which generates the frequency error signal by tracing the frequency of the RF signal recorded on the recording medium, or outputs the phase error signal by tracing the phase of the signal. A second block 830 outputs the wobble error signal from the wobble signal on the recording medium. A clock generating unit 840 selects an output signal from the first block 820 in an area where the RF signal is normally recorded, selects an output signal from the second block 830 in an area where no RF signal or low frequency RF signal is recorded, and generates a clock signal that is obtained by frequency modulation according to the size of the voltage of the input signal.

The preprocessing unit 800 processes a variety of signals read by the pickup and generates the summing signal of the RF signals and the wobble signal to produce binary data. At this time, the summing signal of the RF signals is a signal, analog or digital, and in which the DC component is removed.

The binarization unit 810 reproduces the signal recorded on the recording medium using the output signal of the preprocessing unit 800. The binarization unit 810 may use a simple binarization method such as a sampling method, or may be implemented as a PRML circuit provided in a data reproducing apparatus disclosed in Korean Patent No. 1998-49542, incorporated herein by reference.

According to the clock signal generating system of the present invention, the clock signal can be obtained from a recording medium on which wobble signals are recorded. Also, using the blank signal, the RF signal, and the wobble signal in a way appropriate to a variety of recording media, a reproducing clock signal can be obtained. According to the clock signal generating system, by selectively using the RF signal and the wobble signal, the clock signal appropriate for reproducing data from the variety of recording media is provided.

Although the preferred embodiments of the present invention have been described, it will be understood by those skilled in the art that the present invention should not be limited to the described preferred embodiment, but various changes and modifications can be made within the spirit and the scope of the present invention. Accordingly, the scope of the present invention is not limited within the described range but the following claims.

What is claimed is:

1. An apparatus to record and/or reproduce data to/from a recording medium on which wobble signals and radio frequency (RF) signals are recorded, the apparatus comprising:
   a first block detecting a frequency error signal or a phase error signal from the RF signals on the recording medium and outputting the detected frequency error signal or the detected phase error signal;
   a second block detecting a wobble error signal from the wobble signals on the recording medium and outputting the detected wobble error signal; and
   a clock generating unit generating a clock signal using the detected frequency error signal or the detected phase error signal of the second block when the RF signals have an error, and using the detected wobble error signal of the first block when the wobble signals have an error.

2. The apparatus of claim 1, wherein the first block comprises:
   a blank detecting unit detecting a blank sector from the RF signals;
   a frequency error detecting unit detecting a difference between a frequency of the RF signals and a frequency of a present clock signal which oscillates to output the frequency error signal; and
   a phase detecting unit generating a phase error signal if the frequency error signal detected by the frequency error detecting unit is within a predetermined scope.

3. The apparatus of claim 2, wherein the clock generating unit selects one of output signals from the first block and the second block according to whether a blank signal exists, and generates a clock signal using the selected output value.

4. The apparatus of claim 2, wherein the second block comprises:
   a wobble counter counting the wobble signals using the clock signal and outputting a wobble count value indicative thereof;
   a wobble error detector outputting a wobble lock signal indicating whether an error occurred in the wobble signals in a predetermined sector, and outputting an average wobble value, using the wobble count value; and
   a wobble error generator outputting a difference of the average wobble value and a predetermined wobble reference value when the wobble error detector determines that there is no error in the wobble signals.

5. The apparatus of claim 4, wherein the wobble counter comprises:
   a delay unit delaying the wobble signals and outputting two of the wobble delay signals having one cycle clock difference;
   a reset circuit unit generating a counter reset signal using the two wobble delay signals; and a counter counting the wobble signals using the clock signal until the counter reset signal is input from the reset circuit.

6. The apparatus of claim 5, wherein the delay unit outputs a first delay signal, which is obtained by delaying the wobble signals for one cycle clock, and a second delay signal, which is obtained by delaying the first delay signal for one cycle clock.

7. The apparatus of claim 4, wherein the reset circuit unit comprises:
   a first operation unit performing a first logic operation of the first delay signal and the second delay signal;
   a second operation unit performing a second logic operation of the output of the first operation unit and the first delay signal; and
   a third operation unit performing a third logic operation of the output of the second operation unit and outputs the result which is a reset signal.

8. The apparatus of claim 7, wherein the first logic operation comprises an XOR operation, the second logic operation comprises an AND operation, and the third logic operation comprises a NOT operation.

9. The apparatus of claim 4, wherein the wobble error detector comprises:
   a calculation unit obtaining the average value of wobble signals counted for n sectors;
   a wobble error detector outputting a signal indicating that there is no error in the wobble signals if a difference of two of the wobble signals which are input continuously is less than a predetermined value, and outputting a signal indicating that there is an error in the wobble signals if the difference of the two wobble signals, which are input continuously, is equal to or greater than the predetermined value; and
   a wobble lock signal generator outputting the wobble lock signal which is a result of a logic operation of n output signals obtained from the wobble error detector.

10. The apparatus of claim 9, wherein the logic operation is an AND operation.

11. The apparatus of claim 9, wherein the wobble error generator comprises:
    a subtracter outputting an error obtained by subtracting a predetermined wobble reference value from the average wobble value; and
    a selector outputting the error as a wobble error value when the wobble lock signal indicates that there is no error in the wobble signals.

12. The apparatus of claim 11, wherein the recording medium is a digital versatile disc-random access memory (DVD-RAM), and the predetermined wobble reference value is 186.

13. The apparatus of claim 1, wherein the clock generating unit comprises:
    an error accumulator adding the detected error signals of the first block and the second block;
    a digital-to-analog converter (DAC) converting the added detected error signals from the error accumulator into an analog signal; and
    a voltage-to-frequency converter (VFO) outputting the clock signal obtained by frequency modulation of the analog signal from the DAC.

14. A clock generating apparatus generating a clock signal using wobble signals from a recording medium, the clock generating apparatus comprising:
    a wobble counter outputting a count value obtained by counting the wobble signals using the clock signal;
    a wobble error detector calculating an average wobble value from the count value in a predetermined sector, and generating a wobble lock signal indicating whether an error occurred in the wobble signals in the predetermined sector;
    a wobble error generator generating and outputting a difference of the average wobble value and a predetermined number of clock signals corresponding to a reference wobble value when the wobble lock signal indicates that there is no error in the wobble signals;
    an error accumulator selectively taking a wobble error, a frequency error and a phase error in an RF signal stream on the recording medium, and adding the wobble error, the frequency error, and/or the phase error as an output voltage signal; and
    a voltage-to-frequency converter outputting the clock signal obtained by frequency modulation of the output voltage signal from the error accumulator.

15. The apparatus of claim 14, wherein the wobble counter comprises:
    a delay unit delaying the wobble signals and outputting two of the wobble delay signals having one cycle clock difference;
    a reset circuit unit generating a counter reset signal using the two wobble delay signals; and
    a counter counting the wobble signals using the clock signal until the counter reset signal is input from the reset circuit.

16. The apparatus of claim 15, wherein the delay unit outputs a first delay signal, which is obtained by delaying the wobble signals for one cycle system clock, and a second delay signal, which is obtained by delaying the first delay signal for one cycle clock.

17. The apparatus of claim 15, wherein the reset circuit unit comprises:
    a first operation unit performing a first logic operation of the first delay signal and the second delay signal;
    a second operation unit performing a second logic operation of the output of the first operation unit and the first delay signal; and
    a third operation unit performing a third logic operation of the output of the second operation unit and outputs the result which is a reset signal.

18. The apparatus of claim 17, wherein the first logic operation comprises an XOR operation, the second logic operation comprises an AND operation, and the third logic operation comprises a NOT operation.

19. The apparatus of claim 14, wherein the wobble error detector comprises:
    a calculation unit obtaining the average value of wobble signals counted for n sectors;
    a wobble error detector outputting a signal indicating that there is no error in the wobble signals if a difference of two of the wobble signals which are input continuously is less than a predetermined value, and outputting a signal indicating that there is an error in the wobble signals if the difference of the two wobble signals, which are input continuously, is equal to or greater than the predetermined value; and
    a wobble lock signal generator outputting the wobble lock signal which is a result of a logic operation of n output signals obtained from the wobble error detector.

20. The apparatus of claim 19, wherein the logic operation is an AND operation.

21. The apparatus of claim 14, wherein the wobble error generator comprises:

a subtracter outputting an error obtained by subtracting a predetermined wobble reference value from the average wobble value; and a selector outputting the error as a wobble error value when the wobble lock signal indicates that there is no error in the wobble signals.

22. The apparatus of claim 19, wherein the recording medium is a digital versatile disc-random access memory (DVD-RAM), and the predetermined wobble reference value is 186.

23. An apparatus to record and/or reproduce data to/from a recording medium on which wobble signals and radio frequency (RF) signals are recorded, the apparatus comprising:

a blank detecting unit detecting a blank sector of the RF signals;

a frequency error detecting unit detecting a difference between a frequency of the RF signals and a frequency of a present clock signal;

a phase detecting unit generating a phase error signal if a difference of the frequency of the RF signals and a clock frequency is within a predetermined scope according to the frequency error detecting unit;

a wobble counter outputting a count value obtained by counting the wobble signals using the system clock;

a wobble error detector outputting a wobble lock signal indicating whether an error occurred in the wobble signals during a predetermined time, and outputting an average wobble value; and a wobble error generator outputting a difference of the average wobble value and a predetermined wobble reference value when the wobble error detector determines that there is no error in the wobble signals.

an error accumulator outputting a frequency error or a phase error if the blank sector of the RF signals is not detected, and outputting a wobble error signal if the blank sector is detected;

a digital-to-analog converter (DAC) converting the frequency error, the phase error, or the wobble error signal from the error accumulator into an analog signal; and a voltage-to-frequency converter outputting a clock signal obtained by frequency modulation of the analog signal from the DAC.

24. The apparatus of claim 23, wherein the wobble counter comprises:

a delay unit delaying the wobble signals and outputting two of the wobble delay signals having one cycle clock difference;

a reset circuit unit generating a counter reset signal using the two wobble delay signals; and a counter counting wobble signals using the clock signal until the counter reset signal is input from the reset circuit.

25. The apparatus of claim 24, wherein the delay unit outputs a first delay signal, which is obtained by delaying the wobble signals for one cycle clock, and a second delay signal, which is obtained by delaying the first delay signal for one cycle clock.

26. The apparatus of claim 24, wherein the reset circuit unit comprises:

a first operation unit performing a first logic operation of the first delay signal and the second delay signal;

a second operation unit performing a second logic operation of the output of the first operation unit and the first delay signal; and a third operation unit performing a third logic operation of the output of the second operation unit and outputs the result which is a reset signal.

27. The apparatus of claim 26, wherein the first logic operation comprises an XOR operation, the second logic operation comprises an AND operation, and the third logic operation comprises a NOT operation.

28. The apparatus of claim 23, wherein the wobble error detector comprises:

a calculation unit obtaining the average value of the wobble signals counted for n sectors;

a wobble error detector outputting a signal indicating that there is no error in the wobble signals if a difference of two of the wobble signals which are input continuously is less than a predetermined value, and outputting a signal indicating that there is an error in the wobble signals if the difference of the two wobble signals, which are input continuously, is equal to or greater than the predetermined value; and a wobble lock signal generator outputting the wobble lock signal which is a result of a logic operation of n output signals obtained from the wobble error detector.

29. The apparatus of claim 28, wherein the logic operation is an AND operation.

30. The apparatus of claim 23, wherein the wobble error generator comprises:

a subtracter outputting an error obtained by subtracting a predetermined wobble reference value from the average wobble value; and a selector outputting the error as a wobble error value when the wobble lock signal indicates that there is no error in the wobble signals.

31. The apparatus of claim 30, wherein the recording medium is a digital versatile disc-random access memory (DVD-RAM), and the predetermined wobble reference value is 186.

32. An apparatus to reproduce data on a recording medium on which a wobble signal and RF signals are recorded, the apparatus comprising:

a preprocessing unit processing a variety of signals read by a pickup and generating a summing signal of the RF signals and the wobble signal to generate binary data;

a binarization unit reproducing the binary data of the preprocessing unit using a clock signal;

a first block detecting a frequency error signal or a phase error signal from the RF signals on the recording medium and outputting the detected frequency error signal or the detected phase error signal;

a second block detecting a wobble error signal from the wobble signal on the recording medium and outputting the detected wobble error signal; and a clock generating unit generating the clock signal using the detected signals of the first block and the second block.

33. An apparatus to reproduce data on a recording medium on which wobble signals and RF signals are recorded, the apparatus comprising:

a preprocessing unit processing a variety of signals read by a pickup and generating a summing signal of the RF signals and the wobble signals to generate binary data;

a binarization unit reproducing the binary data of the preprocessing unit using a clock signal;

a blank detecting unit detecting a blank sector of the RF signals;

a frequency error detecting unit detecting a difference between a frequency of the RF signals and a frequency of a present clock signal;

a phase error detecting unit generating a phase error signal if the difference of the frequency of the RF signals and the frequency of the present clock signal is within a predetermined scope;

a wobble counter outputting a count value obtained by counting the wobble signals using a system clock;

a wobble error detector outputting a wobble lock signal indicating whether an error occurred in the wobble signals for a predetermined time, and calculating an average wobble value;

a wobble error generator outputting a difference of the average wobble value and a predetermined wobble reference value when the wobble error detector determines that there is no error in the wobble signals;

an error accumulator outputting a frequency error or a phase error if the blank sector of the RF signals is not detected, and outputting a wobble error signal if the blank sector is detected;

a digital-to-analog converter (DAC) converting the frequency error, the phase error, or the wobble error signal from the error accumulator into an analog signal; and a voltage-to-frequency converter outputting a clock signal obtained by frequency modulation of the analog signal from the DAC.

34. A clock generating apparatus generating a clock signal using wobble signals from a recording medium, the clock generating apparatus comprising:

a first block detecting a frequency error signal or a phase error signal from RF signals on the recording medium and outputting the detected frequency error signal or the detected phase error signal;

a wobble counter outputting a count value obtained by counting the wobble signals using the clock signal;

a wobble error detector calculating an average wobble value from the count value in a predetermined sector, and generating a wobble lock signal indicating whether an error occurred in the wobble signals in the predetermined sector;

a wobble error generator determining a difference of the average wobble value and a predetermined number of clock signals corresponding to a reference wobble value when the wobble lock signal indicates that there is no error in the wobble signals; and an error accumulator selectively taking a wobble error, the detected frequency error and the detected phase error, and to determine therefrom the clock signal.

35. The apparatus of claim 34, further comprising:

a digital-to-analog converter (DAC) converting the selected error signals from the error accumulator into an analog signal; and a voltage-to-frequency converter (VFO) outputting the clock signal obtained by frequency modulation of the analog signal from the DAC.

* * * * *